United States Patent [19]

Meyer et al.

[11] Patent Number: 4,754,000

[45] Date of Patent: Jun. 28, 1988

[54] ACTIVATED ANIONIC POLYMERIZATION OF LACTAMS

[75] Inventors: Rolf-Volker Meyer; Friedrich Fahnler; Rolf Dhein; Dietrich Michael, all of Krefeld, Fed. Rep. of Germany

[73] Assignee: Bayer Aktiengesellschaft, Leverkusen, Fed. Rep. of Germany

[21] Appl. No.: 50,521

[22] Filed: May 18, 1987

Related U.S. Application Data

[62] Division of Ser. No. 750,000, Jul. 1, 1985, Pat. No. 4,684,746.

[30] Foreign Application Priority Data

Jul. 10, 1984 [DE] Fed. Rep. of Germany ....... 3425318

[51] Int. Cl.[4] ................... C08F 283/04; C08G 69/48; C08L 77/00
[52] U.S. Cl. .................................. 525/420; 528/315; 528/323
[58] Field of Search ................. 528/315, 323; 525/420

[56] References Cited

U.S. PATENT DOCUMENTS

| 3,671,501 | 6/1972 | Johnson | 528/315 |
| 4,191,819 | 8/1977 | Meyer et al. | 528/315 |
| 4,490,520 | 2/1987 | Kawachingan et al. | 528/315 |

FOREIGN PATENT DOCUMENTS

| 0088560 | 9/1983 | European Pat. Off. . |
| 863859 | 7/1957 | Fed. Rep. of Germany . |
| 2362179 | 4/1978 | France . |

OTHER PUBLICATIONS

Patent Abstracts of Japan, Book 8, No. 212 (C-244) [1649], Sep. 27, 1984; & JP-A-59 100 134 (Ube Kosan K.K.) 9.06.1984 (Kat.A).

Primary Examiner—Morton Foelak
Attorney, Agent, or Firm—Connolly and Hutz

[57] ABSTRACT

Biuret-group-containing polyisocyanates based on non-aromatic diisocyanates, possibly mixed with liquid N-alkyl-lactams, as activators for activated anionic polymerization of lactams.

8 Claims, No Drawings

ACTIVATED ANIONIC POLYMERIZATION OF LACTAMS

This is a division of application Ser. No. 750,000 filed July 1, 1985, now U.S. Pat. No. 4,684,746.

The subject of the invention is a process for the production of polyamides by activated anionic polymerization of lactams in which biuret-group-containing polyisocyanates are used as activators.

The activated anionic polymerization of lactams is used in the production of polyamide mouldings according to a wide variety of techniques. The smooth progress of the polymerization, and also the quality of the polyamides produced by the various processes, depend not only on the catalyst, but also, and to a significant extent, on the type of activator employed.

Numerous compounds have been used as activators in the anionic polymerization of lactams, e.g. acyl-lactams, substituted triazines, carbodiimides, cyanamides, isocyanates and the corresponding masked isocyanate compounds. In principle the activators can be monofunctional or polyfunctional, but polyfunctional activators are known to give products that have higher molecular weight and are in some cases crosslinked.

Polyisocyanates, preferably diisocyanates, are activators that are widely used in practice. Particular preference is given to hexamethylene diisocyanate because this freely mobile liquid offers great advantages, especially in continuous processes in which accurate dosage via metering pumps is important. The toxicity of hexamethylene diisocyanate, which arises from the high vapour pressure of this compound (3 torr at 102° C., 20 torr at 143° C.) and which necessitates special precautions in every operation, is a considerable disadvantage, however. This disadvantage is particularly conspicuous in operational disturbances that necessitate opening of pumps and feed pipes.

Hexamethylene-biscarbamido-caprolactam, which is proposed in DAS No. 1 420 241, is satisfactory from the aspect of toxicity, but, like practically all diisocyanates that are di-masked with lactams, it is a crystalline substance and therefore virtually unusable in continuous production.

The use of melts is disadvantageous because it necessitates the use of heated pumps and pipelines and because the masked isocyanates may undergo cleavage.

Allophanate-group-containing polyisocyanates, produced from non-aromatic diisocyanates and alcohols (DOS No. 2 729 990) flow freely, can be produced so as to be substantially free of monomeric diisocyanate, and are, in principle, well suited for use as activators in the anionic polymerization of lactams (EP No. 3729).

But polyamides produced with allophanate-group-modified polyisocyanates as activators have molecular weights that are comparatively low and do not always meet all the technical requirements.

It has now been found, to our surprise, that biuret-group-containing polyisocyanates from non-aromatic diisocyanates represent particularly efficient activators for the anionic polymerization of lactams, because they are liquid (and therefore easily meterable), almost entirely free from diisocyanate (which enables them to be handled easily without a risk of toxicity) and give polyamides of very high molecular weight.

It is also surprising that, additionally the viscosity of biuret-group-containing polyisocyanates can be reduced to any desired extent with N-alkyl-lactams, cavity-free polyamide mouldings of high quality are obtained during the polymerization process.

The subject of the invention is a process for the production of polyamides by polymerization of lactams in the presence of catalysts and activators and possibly of additional copolymerizable components, characterized in that biuret-group-containing polyisocyanates from non-aromatic diisocyanates, preferably from aliphatic diisocyanates with dynamic viscosities below 12,000 mPa.s, preferably below 5,000 mPa.s, but more especially below 2,000 mPa.s, are used as activators, these activators possibly being mixed with liquid N-alkyl-lactams.

A further subject of the invention is formed by biuret-group-containing polyisocyanates, possibly mixed with liquid N-alkyl-lactams, preferably N-methylcaprolactam and/or N-methylpyrrolidone, as activators for the activated anionic polymerization of lactams.

The production of biuret-group-containing isocyanates has been known for a long time. It can, for example, be carried out by reacting diisocyanates with defined amounts of water (DAS No. 1 101 394) or with tertiary alcohols (DOS No. 1 543 178). Reactions of diisocyanates with diamines to produce biuret-group-containing polyisocyanates have been described also (DOS No. 2 261 065, DOS No. 2 609 995, EP NO. 0 003 505, A. Balewski et al. in "Die Angew. Makromol. Chem.", Vol. 131, pp. 1 ff.). Continuous processes for the production of biuret-group-containing polyisocyanates with the aid of special adduct-forming agents are described in, e.g., DOS No. 28 08 801 and DOS No. 30 30 655.

According to how the reaction is carried out, products with different degrees of viscosity can be obtained.

The use of biuret-group-containing polyisocyanates to produce polyurethane plastics by the isocyanate polyaddition process and to produce high quality coatings, which, in the case of products produced from non-aromatic diisocyanates, are also resistant to weathering and non-yellowing, is known.

It was entirely surprising, and unpredictable, that biuret-group-containing polyisocyanates from non-aromatic diisocyanates are very effective as activators for the anionic polymerization of lactams, are easily handled and lead to polyamides of very high quality.

Diisocyanates suitable for the production of the biuret-group-containing polyisocyanates to be used in accordance with the invention are ones having the general formula $$Q(NCO)_2,$$

where Q stands for an araliphatic hydrocarbon residue with $C_7$-$C_{15}$, especially 8 carbon atoms, an aliphatic hydrocarbon residue with 2 to 12 carbon atoms, preferably 4 to 10 C atoms, or a cycloaliphatic hydrocarbon residue with 4 to 15 carbon atoms, preferably 6 to 12 C atoms.

Examples of such diisocyanates are ethane-1,2-diisocyanate, butane-1,4-diisocyanate, hexamethylene-1,6-diisocyanate, 2-methylpentane-1,5-diisocyanate, 2-ethyl-butane-1,4-diisocyanate, trimethyl hexamethylene diisocyanates, 2-methyl-nonamethylene diisocyanate, decamethylene diisocyanate, undecamethylene diisocyanate, dodecamethylene diisocyanate, 1,4-diisocyanatocyclohexane, 1-methyl-2,4-diisocyanatocyclohexane, 4,4'-diisocyanato-dicyclohexylmethanes, 3,3,5-trimethyl-5-isocyanatomethyl-cyclohexyl-isocyanate (IPDI), isomer mixtures of bis-isocyanatomethyl-tricyclodecane, xylylene diisocyanates and mixtures of these diisocyanates.

Preferred diisocyanates are hexamethylene diisocyanate, 2-methylpentamethylene diisocyanate (mixed with 2-ethyl-butane-1,4-diisocyanate), 4,4'-diisocyanatodicyclohexylmethane and isophorone diisocyanate and mixtures of these diisocyanates. Particular preference is given to biuret-group-containing polyisocyanates from hexamethylene diisocyanate.

The activators according to the invention should have dynamic viscosities of not more than 12,000 mPa.s, preferably not more than 5,000 mPa.s, and most preferably <2000 mPa.s, and can be diluted with liquid N-alkyl-lactams to almost any desired extent without any difficulty and without an adverse effect on the polymerization reaction.

Liquid $C_1$-$C_{22}$-, preferably $C_1$-$C_8$-, -alkyl-N-substituted lactams with 4 to 13 ring members, preferably 5-7 ring members, are suitable as N-alkyl-lactams.

Examples of N-alkyl-lactams that can be used in accordance with the invention are N-methyl-pyrrolidone, N-methyl-piperidone, N-methyl-caprolactam, N-methyllauric-lactam, N-ethyl-pyrrolidone, N-methylcaprolactam, N-vinyl-pyrrolidone, N-vinyl-caprolactam, N-isopropyl-caprolactam, N-hexyl-caprolactam and N-octyl-caprolactam.

Preferably N-methyl-pyrrolidone, N-methyl-caprolactam, N-ethyl-caprolactam and N-vinyl-pyrrolidone, most preferably N-methyl-pyrrolidone and/or N-methyl-caprolactam, are used to reduce the viscosity of the biuret-group-containing polyisocyanates.

Only in a few cases is it necessary to add to the biuret-group-containing polyisocyanates a more than equal number of parts by weight of the N-alkyl-lactams; generally 0–70, preferably 0–50, parts by weight of N-alkyl-lactam, calculated on 100 parts by weight of polyisocyanate, is sufficient.

Having an extremely small content of free diisocyanate and a low vapour pressure ($<10^{-2}$ torr at 100° C., about 0.1 torr at 140° C.), the activators according to the invention are relatively non-hazardous to handle, they are less objectionable from the aspect of toxicity and they can be conveyed without difficulty with the aid of conventional pumps. At room temperature they do not react with water appreciably; and, if an operational disturbance occurs or cleaning is necessary, they can be easily dissolved with commonly used rinsing agents, such as isopropanol, despite the gradual reaction with the alcohol.

In particular, attention is drawn also to the excellent storage stability of the biuret-group-containing polyisocyanates according to the invention.

During the anionic activated lactam polymerization the activators are metered continuously or discontinuously, at the normal concentrations of preferably 0.5–5% by weight, calculated on the pure polyisocyanate portion, into the lactam melt to be polymerized.

All catalysts that are used in the anionic polymerization of lactam, preferably alkali and alkaline-earth lactamates such as sodium lactamates, sodium hydride and also latent catalysts, can be used as catalysts at the familiar concentrations.

The activators according to the invention are suitable for the polymerization of lactams with at least 5 ring members - such as, for example, α-pyrrolidone, ε-caprolactam, C-substituted caprolactams and lauric lactam—or of mixtures of the said lactams.

In particular the activators according to the invention are also suitable for the production of polyamide block copolymers, produced, for example, by polymerization of ε-caprolactam with insertion of 1–30 % by weight of polyether soft segments via amino-group-terminated polyethers with functionalities of at least three and molecular weights of at least 2,000, where, by the use of the biuret-group-containing polyisocyanate activators according to the invention, much improved phase separations between the elastomer phase and hard segment phase can be obtained, allowing mouldings produced from these polyamide block copolymers to have much improved mechanical properties in use.

The biuret-group-containing polyisocyanates to be used according to the invention are most particularly effective as activators in recipes for block copolyamides from ε-caprolactam and 8–20% by weight of soft segments (polyether segments).

The activators are suitable for the activated anionic polymerization of lactams, and possibly of soft segments, according to all the known processes, particularly continuous processes.

In the production of semi-finished goods they can thus be used according to the method of pressureless casting. In this instance two separate lactam melts containing, respectively, catalyst or activator, are prepared, united and mixed, and then introduced immediately into a casting mould. The polymerization is normally carried out at temperatures between 140 and 200° C., the polyamide thus formed acquiring the shape of the mould. The activators can be used in the rotational casting process, in which a polymerizable melt is introduced into a mould rotating round two axes positioned at an angle to one another and the polymerization is initiated by heating.

Further examples of processing techniques in which the activated anionic polymerization according to the invention is used are rotational casting and polymerization in the cylinder of an injection moulding machine.

The activators according to the invention are particularly suitable for the production of polyamide block copolymers with amino polyether soft segments by anionic polymerization of ε-caprolactam in extruders, at temperatures between 90° to 300°, preferably from 100° to 250°, more preferably from 110°–160° where the products thus formed can be expressed from the extruder as strands and processed in the form of granules by the familiar plastics-processing techniques.

EXAMPLES 1-6

(A) Conduct of the polymerization

The total amount of ε-caprolactam is divided equally among two vessels under $N_2$ atmosphere and heated to about 100° C. The necessary amount of Na-caprolactamate in the form of an 20% solution in caprolactam is added as catalyst to one half and the appropriate amount of the respective biuret-polyisocyanate activator (I-IV) to the other half. With the aid of metering pumps the melts are united in a mix head in the ratio 1:1 and fed into a rotation mould which has the dimensions 300×200×180 mm and has been heated to 180° C. After the introduction of 1,600 g of reactive lactam melt the supply is interrupted. Through biaxial rotation of the mould, which is rotated round the primary axis at speeds of 25 $min^{-1}$ and round the secondary axis at speeds of 10 $min^{-1}$, a hollow polyamide body with a wall thickness of 4 mm is produced. The polymerization is complete after three minutes, and the hollow body is removed from the mould after a cooling time of one minute in air.

The hollow bodies are kept for 24 hours in a standardized atmosphere (23° C., 50% relative humidity). Standard small specimens are then cut from the walls of the hollow bodies for measurement of viscosity (according to various methods) and for determination of mechanical properties.

The actual recipes (showing the percentages by weight) and certain properties of the polyamides are compiled in Table 1.

(B) Activors used

I. Biuret-modified polyisocyanate based on hexamethylene-1,6-diisocyanate, NCO content 22.0%, viscosity at 23° C.: approx. 11.000 mPa.s("Desmodur N" 100 ®, Bayer AG)

II. As I, NCO content 23.0%, viscosity 2,500 mPa.s ("Desmodur N 3200" ®, Bayer AG)

III. Biuret-modified polyisocyanate based on tetramethylene diisocyanate (analogous to example 4 of DOS No. 28 08 801), NCO content 28.2%.

IV. Biuret-modified polyisocyanate based on isophorone diisocyanate (analogous to example 12 of DOS 28 08 801); NCO content 17.4%. Viscosity at 50° C.: 2,900 mPa.s.

V. (For comparison): Allophanate-modified polyisocyanate based on hexamethylene-1,6-diisocyanate, on n-butanol, NCO content 17.3%, viscosity at 25° C.: 160 mPa.s (example 1 of DOS No. 27 46 702).

| Dilution of activators with N—alkyl-lactams | | | |
|---|---|---|---|
| Product | Diluent | Quantity ratio I-IV/diluent (% by wt.) | Viscosity at 23° C. (mPa.s) |
| (IA) | | 90:10 | 2300 |
| (IB) | N—methyl- | 75:25 | 270 |
| (IC) | pyrrolidone | 65:35 | 120 |
| (ID) | | 60:40 | 90 |
| (IE) | N—methyl- | 75:25 | 520 |
| (IF) | caprolactam | 60:40 | 140 |
| (IIA) | N—methyl- | 75:25 | 210 |
| (IIB) | pyrrolidone | 70:30 | 120 |
| II C | N—Me—caprolactam | 70:30 | 300 |
| II D | N—vinyl-caprolactam | 70:30 | 340 |
| IV A | N—methyl-pyrrolidone | 60:40 | 350 |

(C) Determination of the quality of the polyamide products

1. Determination of the dye penetration time according to TRbF 413, 3rd edition, 1978, section 2.112 ("sulphuric acid test")

The "Technische Regeln für brennbare Flüssigkeiten (TRbF)" (Technical Guidelines for Combustible Fluids) lay down requirements that must be met by finished parts consisting of polyamides produced by activated anionic polymerization of ε-caprolactam.

The prescribed "sulphuric acid test" to determine whether the molecular weight is sufficiently high is carried out as follows:

Determination of the dye penetration time (1) Cylindrical samples with a diameter of 3 mm and height of (4±0.5) mm are taken from the wall of the moulding, their longer dimension having been parallel to the moulding's vertical axis.

(2) The dye penetration time of samples with a height of less than 3.5 mm is to be fixed separately.

(3) The moisture content of the samples must not exceed 0.7%.

(4) The test is carried out in test tubes having an inside diameter of (4±0.1) mm and a length of about 80 mm. The following are used as test media:
  1. 96% sulphuric acid and
  2. 96% sulphuric acid, stained blue-green by addition of 0.1 g/l diphenyl amine and 0.1 g/l 65% nitric acid.

(5) To enable the test to be carried out, the test tube is filled with unstained sulphuric acid to a height of about 30 mm. The cylindrical sample is submerged in the liquid with the aid of a glass rod (care being taken to ensure that no air bubbles remain in the sulphuric acid) and the test tube is placed in a heating bath (90±2)° C. After a preswelling time of three hours stained sulphuric acid is poured into the test tube until the level of the liquid has risen by about 20 mm, after which the test tube is allowed to remain in the heating bath.

(6) The sample is sufficiently polymerized if, after a total of 5.5 hours (three hours preswelling time and 2.5 hours test time), there is still a clear demarcation between the swollen test piece and the stained sulphuric acid.

(7) The stained sulphuric acid must not have penetrated into the unstained sulphuric acid beneath it. No individual dye penetration time may be less than 5.5 hours.

The column "H2SO4 test" in Table 1 indicates by means of the symbols +/— the passing/non-passing of this test, and the times measured up to the incipient penetration of the dye.

2. Machining behaviour ("MB test")

In the machining of semi-finished goods at the high cutting speeds normally used in practice parts consisting of polyamides produced by activated anionic polymerization of ε-caprolactam behave in a more or less ductile manner according to their molecular weight.

In the machining of relatively inferior products micro-notches are formed on the surfaces and significantly impair the mechanical properties of the finished goods (rendering them sensitive to breakage under heavy impact). Lack of ductility prevents the formation of a smoothly flowing chip (this defect being indicated in Table 1 by the symbol —).

Products of very high molecular weight show, in contrast, ductile behaviour, the chip flowing smoothly. The finished parts can be subjected to heavy mechanical loads in practice ( indicated in Table 1 by the symbol +).

TABLE 1

| Example | Catalyst (% weight) | Activator Type | Amount (% weight) | $t_f^{(x)}$ | $^{(a)}\eta$ rel | $^{(b)}$ | H2SO4 test | MB test |
|---|---|---|---|---|---|---|---|---|
| 1 | 1.5 | I | 0.4 | 6'30" | insoluble | insoluble | (+) 7.5 h | + |
| 2 | 1.5 | I D | 0.6 | 6'40" | " | " | (+) 7.5 h | + |
| 3 | 1.5 | II C | 0.5 | 6'30" | " | " | (+) 8.5 h | + |
| 4 | 1.5 | III | 0.3 | 6'20" | " | " | (+) 8 h | + |
| 5 | 1.5 | IV A | 0.5 | 7'20" | " | " | (+) 8.5 h | + |

TABLE 1-continued

| Example | Catalyst (% weight) | Activator Type | Amount (% weight) | $t_i^{(x)}$ | Properties of the polyamides | | | |
|---|---|---|---|---|---|---|---|---|
| | | | | | $^{(a)}\eta$ rel | $^{(b)}$ | $H_2SO_4$ test | MB test |
| 6 | 1.5 | I F | 0.5 | 6'30" | " | " | (+) 8 h | + |
| Control test | 1.5 | V | 0.6 | 7'10" | 6.3 | 4.79 | (−) 3.5 h | − |

$^{(a)}$1% solution of the polyamide in m-cresol at 25° C.
$^{(b)}$ISO R 307 in formic acid
$^{(x)}$The polymerization time $t_i$ was determined in tests on the scale of 100 grams. $t_i$ is the time elapsing between the immersion of the complete reaction mixture into the heating bath at 180° C. and the incipient viscosity increase.

EXAMPLE 7

41.7 g of ε-caprolactam, 12 g of an aminopolyether mixture with an average functionality of 3.2, produced by alkoxylation of trimethylol propane with propylene oxide and subsequent reaction with ammonia under pressure (amination degree: 100%, molecular weight 4,800) and by analogous alkoxylation of pentaerythrite and subsequent amination (amination degree: 95%, molecular weight 6,400), and 4.0 g of a 20% solution of Na-caprolactamate in ε-caprolactam are heated under $N_2$ protective gas to 115° C. (melt A).

In a second storage vessel 40.0 g of ε-caprolactam and 2.3 g of a biuret-modified polyisocyanate based on hexamethylene diisocyanate (NCO content: 23.0%, viscosity at 23° C.: 2,500 mPa.s) are heated simultaneously to 110° C. (melt B).

The two melts are introduced simultaneously into a polymerization vessel heated to 140° C. and mixed well by stirring, 60 seconds after which the polymerization (measurable with a stirrer attached to a viscometer) begins; after a further 80 seconds the polymerization is complete.

A very homogeneous and light-coloured polymer block with the typical intrinsic colour of polyamide and a very good surface is obtained. After the block has been cooled to −30° C. and clamped in a vice it cannot be broken with a hammer and chisel.

Samples for determination of mechanical properties were cut from the polymer block.

The low-molecular portion extractable with methanol represents 1.6%. Data for certain properties of the polymers are given in Table 2.

EXAMPLES 8–12

Various amounts of amino-group-terminated polyethers were used in conjunction with various biuret polyisocyanate activators according to a procedure analogous to the test procedure described in example 7.

The recipes (showing the amounts as percentages by weight) and the data for a selection of properties are given in Table 2.

TABLE 2

| | Composition in % weight | | | | | |
|---|---|---|---|---|---|---|
| Example: | 7 | 8 | 9 | 10 | 11 | 12 |
| ε-Caprolactam | 81.7 | 77.6 | 72.2 | 77.7 | 76.1 | 77.9 |
| Catalyst$^{(x)}$ | 4 | 5 | 5 | 5 | 5 | 5 |

TABLE 2-continued

| | Composition in % weight | | | | | |
|---|---|---|---|---|---|---|
| Example: | 7 | 8 | 9 | 10 | 11 | 12 |
| Activator I | — | 2.4 | 2.8 | — | — | — |
| Activator II | 2,3 | — | — | 2.3 | — | — |
| Activator IV | — | — | — | — | 3.3 | — |
| Activator III | — | — | — | — | — | 2.4 |
| Aminopolyether A | 12 | 15 | 20 | 15 | 15 | 15 |
| Properties | | | | | | |
| $a_k$ (23° C., kJ/m²) | 57$^{(a)}$ | 70$^{(a)}$ | 64$^{(a)}$ | 53$^{(a)}$ | 45$^{(a)}$ | 60$^{(a)}$ |
| $a_k$ (−20° C., kJ/m²) | 21 | 38$^{(a)}$ | 30$^{(a)}$ | 35$^{(a)}$ | 27 | 32$^{(a)}$ |
| Ball indentation hardness (N/mm²) | 85 | 75 | 63 | 86 | 72 | 79 |

$^{(x)}$as described in example 7
$^{(a)}$partly broken

We claim:

1. In the process for the production of polyamides or polyamide block copolymers with build-in elastomer soft segments by activated anionic polymerization of lactams or lactams and elastomer soft segment in the presence of catalysts and activators,
   the improvement comprises said activators being biuret-group-containing polyisocyanates based on non-aromatic diisocyanates or said polyisocyanates mixed with liquid N-alkyl-lactams.

2. Process according to claim 1 wherein ε-caprolactam is used as the lactam.

3. Process according to claim 1 wherein 1–30% by weight of aminopolyether whose amino functionality is at least three is present as an elastomer soft segment in the anionically activated polymerization of lactams.

4. Process according to claim 1 wherein said diisocyanate is of the formula $$Q(NCO)_2,$$

where Q is $C_7$–$C_{15}$ araliphatic hydrocarbon residue, $C_2$–$C_{12}$ aliphatic hydrocarbn residue, $C_4$–$C_{15}$ cycloaliphatic hydrocarbon residue.

5. Process according to claim 1 wherein said diisocyanate is hexamethylene diisocyanate, 2-methylpentamethylene-diisocyanate (mixed, with 2-ethylbutane-1,4-diisocyanate), 4,4'-diisocyanatodicyclohexylmethane, isophorone diisocyanate, or mixtures thereof.

6. Process according to claim 1 wherein the lactam is $C_1$–$C_{22}$-alkyl-N-substituted lactam having 4–13 ring atoms.

7. Process according to claim 1 wherein the lactam is N-methyl pyrrolidone, N-methyl caprolactam or a mixture of both.

8. Polyamides produced by the process according to claim 1.

* * * * *